(12) United States Patent
Miller et al.

(10) Patent No.: US 12,112,449 B2
(45) Date of Patent: *Oct. 8, 2024

(54) CAMERA-BASED TRANSPARENT DISPLAY

(71) Applicant: Apple Inc., Cupertino, CA (US)

(72) Inventors: Brett D. Miller, Redwood City, CA (US); Minwoong Kim, San Jose, CA (US); Ricardo J. Motta, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,769

(22) Filed: Jun. 20, 2023

(65) Prior Publication Data

US 2023/0334617 A1 Oct. 19, 2023

Related U.S. Application Data

(63) Continuation of application No. 17/651,001, filed on Feb. 14, 2022, now Pat. No. 11,720,996, which is a
(Continued)

(51) Int. Cl.
*G06T 3/18* (2024.01)
*G06T 7/50* (2017.01)
(Continued)

(52) U.S. Cl.
CPC .................. *G06T 3/18* (2024.01); *G06T 7/50* (2017.01); *G06T 7/70* (2017.01); *G06V 20/10* (2022.01);
(Continued)

(58) Field of Classification Search
CPC ........... G06T 7/50; G06T 3/0093; G06T 7/70; G06T 3/18; G06T 7/593;
(Continued)

(56) References Cited

U.S. PATENT DOCUMENTS 6,452,544 B1 9/2002 Hakala
8,881,059 B2 11/2014 Adachi
(Continued)

FOREIGN PATENT DOCUMENTS

CN 103988234 A 8/2014
CN 106101522 A 11/2016

OTHER PUBLICATIONS

Hillaire, et al., "Using an Eye-Tracking System to Improve Camera Motions and Depth-of-Field Blur Effects in Virtual Environments," 2008 IEEE Virtual Reality Conference.
(Continued)

*Primary Examiner* — Nicholas G Giles
(74) *Attorney, Agent, or Firm* — Blank Rome LLP

(57) ABSTRACT

Presenting an image of a scene may include capturing an image of a scene by a camera of an electronic device, wherein the electronic device comprises the camera and a display, and wherein the camera and the display have a first spatial relationship, determining a second spatial relationship between a viewpoint and the display of the electronic device, warping the image to obtain an image of a first portion of the scene based on the first spatial relationship and the second spatial relationship, and presenting the warped image on the display, wherein, from the viewpoint, the image of the first portion of the scene is substantially contiguous with a second portion of the scene visible outside an edge of the electronic device.

20 Claims, 7 Drawing Sheets

Related U.S. Application Data continuation of application No. 16/125,363, filed on Sep. 7, 2018, now Pat. No. 11,250,541.

(60) Provisional application No. 62/556,150, filed on Sep. 8, 2017.

(51) Int. Cl.
  *G06T 7/521* (2017.01)
  *G06T 7/593* (2017.01)
  *G06T 7/70* (2017.01)
  *G06V 20/10* (2022.01)
  *H04N 5/262* (2006.01)
  *H04N 9/73* (2023.01)
  *H04N 23/63* (2023.01)
  *H04N 23/67* (2023.01)
  *H04N 23/90* (2023.01)

(52) U.S. Cl.
  CPC ............ *H04N 5/2621* (2013.01); *H04N 9/73* (2013.01); *H04N 23/63* (2023.01); *H04N 23/90* (2023.01); *G06T 7/521* (2017.01); *G06T 7/593* (2017.01); *G06T 2207/20164* (2013.01); *G06T 2207/30201* (2013.01); *H04N 23/67* (2023.01)

(58) Field of Classification Search
  CPC ...... G06T 2207/20164; G06K 9/00664; H04N 5/23293; H04N 5/247; H04N 5/2621; H04N 9/73; H04N 23/63; H04N 23/90; G06F 3/01; G06F 3/04815; G06V 20/10
  See application file for complete search history.

(56) References Cited

U.S. PATENT DOCUMENTS

| | | | |
|---|---|---|---|
| 9,164,581 B2* | 10/2015 | Robinson | G06F 3/04815 |
| 9,401,050 B2 | 7/2016 | Cajigas | |
| 9,535,496 B2* | 1/2017 | Mullins | G06F 3/005 |
| 10,180,715 B2* | 1/2019 | Fein | G06T 11/60 |
| 11,250,541 B2* | 2/2022 | Miller | H04N 5/2621 |
| 2013/0207896 A1* | 8/2013 | Robinson | G06F 3/013 |
| | | | 345/158 |
| 2014/0098133 A1* | 4/2014 | Fein | G06T 19/006 |
| | | | 345/633 |
| 2014/0192164 A1 | 7/2014 | Tenn | |
| 2014/0267012 A1* | 9/2014 | Mullins | G06F 3/017 |
| | | | 345/156 |
| 2017/0032559 A1 | 2/2017 | Chao | |

OTHER PUBLICATIONS

Kyriazakos et al., "A User-Perspective View for Mobile AR Systems Using Discrete Depth Segmentation", 2015 International Conference on Cyberworlds, IEEE, Oct. 7, 2015, pp. 69-72.

* cited by examiner

CAMERA-BASED TRANSPARENT DISPLAY

BACKGROUND

This disclosure relates generally to the field of digital image processing, and more specifically to the field of providing a camera-based transparent display.

Many multifunctional electronic devices, such as smart phones and tablets, include a camera and display device that allow a user to utilize the display to preview and view images captured by the camera. When a traditional multi-functional device is used in preview mode, the image displayed on the screen represents an image from the camera's point of view. Therefore, when a user holds the device in front of a scene and views the display, the image on the screen does not line up with the scene behind it. That is, the user's point of view differs from the point of view of the lens capturing the image, leading to a disconnect between the user's point of view and the real environment. That is, to the user, the image may appear in the wrong position and the wrong scale.

SUMMARY

In one embodiment, a method for presenting an image of a scene is described. The method may include capturing an image of a scene by a camera of an electronic device, wherein the electronic device comprises the camera and a display, and wherein the camera and the display have a first spatial relationship, determining a second spatial relationship between a viewpoint and the display of the electronic device, warping the image to obtain an image of a first portion of the scene based on the first spatial relationship and the second spatial relationship, and presenting the warped image on the display, wherein, from the viewpoint, the image of the first portion of the scene is substantially contiguous with a second portion of the scene visible outside an edge of the electronic device.

In another embodiment, the method may be embodied in computer executable program code and stored in a non-transitory storage device. In yet another embodiment, the method may be implemented in an electronic device having image capture capabilities.

DETAILED DESCRIPTION

Figure 1:
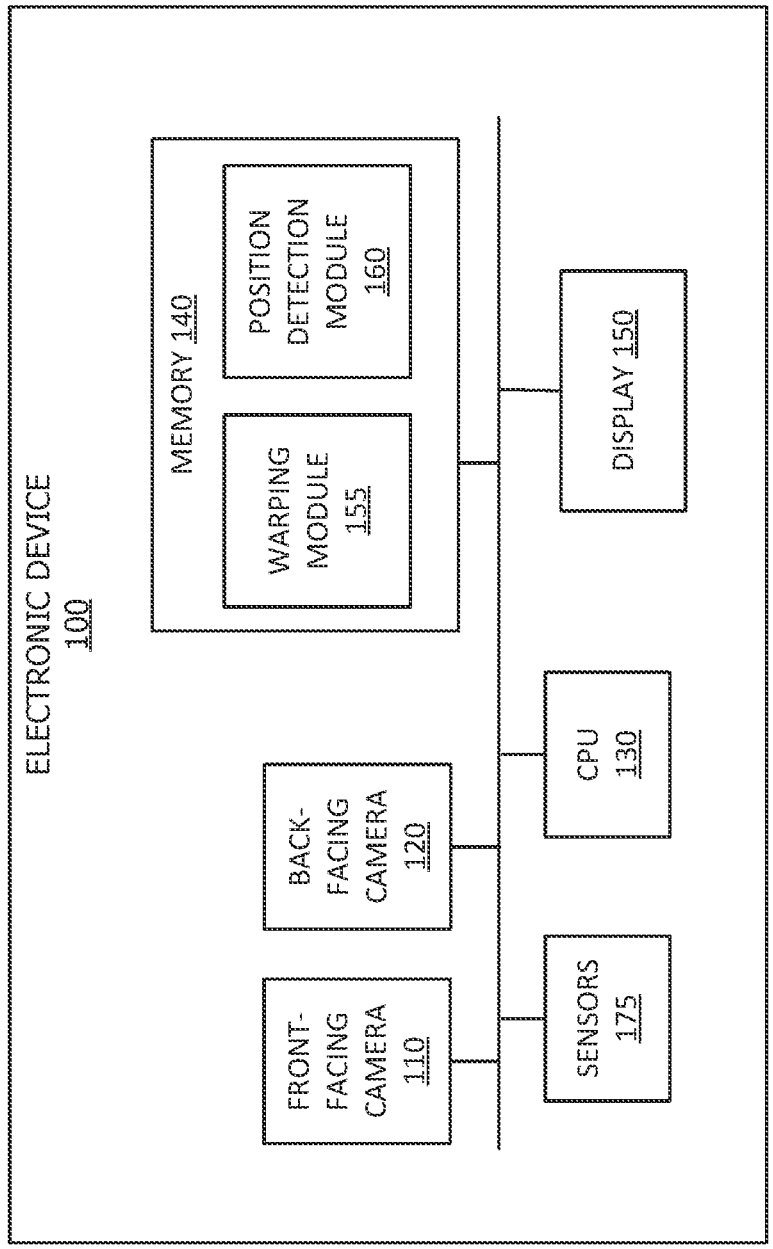
FIG. 1 shows, in block diagram form, a simplified electronic device according to one or more embodiments.

This disclosure is directed to systems, methods, and computer readable media for presenting a warped image of a scene. In general, techniques are disclosed to provide a warped image of a scene such that the image of the environment in the scene appears seamless with the real environment on a display from a viewpoint. According to one or more embodiments, displaying the warped image may provide a more realistic view of the real environment on an electronic device.

According to one or more embodiments, a back-facing camera of an electronic device may capture an image of a view of a real environment. A determination may be made regarding a spatial relationship between a viewpoint and the electronic device, and a spatial relationship between a camera and a display of the electronic device. A warping function may be applied to the image based on the spatial relationships. The warped image may then be presented on a front-facing display on the electronic device such that the image of the real environment appears substantially contiguous with background (i.e., the rest of the real environment). That is, the scene may appear contiguous in the real world and the display, except for any borders or boundaries of the electronic device around the display. Given a viewpoint relative to a screen of an electronic device, the image captured by the camera may be transformed relative to the screen, or re-projected, so that at least one object in the scene has the same position and sale as the real object behind the scene, from the viewpoint of the user. Thus, the electronic device may appear transparent, or the image of the scene may appear substantially seamless with the scene behind it from the viewpoint of the user, according to one or more embodiments.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100*a* and 100*b*). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "lens" refers to a lens assembly, which could include multiple lenses. In one or more embodiments, the lens may be moved to various positions to capture images with different points of focus. Further in one or more embodiments, the lens may refer to any kind of lens, such as a telescopic lens or a wide angle lens. As such, the term lens can mean a single optical element or multiple elements configured into a stack or other arrangement.

For purposes of this disclosure, the term "camera system" refers to one or more lens assemblies along with the one or more sensor elements and other circuitry utilized to capture an image. For purposes of this disclosure, the "camera" may include more than one camera system, such as a stereo camera system, multi-camera system, or other camera system capable of sensing the depth of the captured scene.

Referring to FIG. 1, a simplified block diagram of an electronic device 100 is depicted, in accordance with one or more embodiments of the disclosure. Electronic device 100 may be part of a multifunctional device, such as a mobile phone, tablet computer, personal digital assistant, portable music/video player, wearable device, or any other electronic device that includes a camera system. FIG. 1 shows, in block diagram form, an overall view of a system diagram capable of supporting image warping, according to one or more embodiments. Specifically, FIG. 1 depicts an electronic device 100 that is a computer system. Electronic device 100 may be connected to other network devices across a network, such as mobile devices, tablet devices, desktop devices, as well as network storage devices such as servers and the like.

Electronic Device 100 may include processor 130, such as a central processing unit (CPU). Processor 130 may be a system-on-chip such as those found in mobile devices and include one or more dedicated graphics processing units (GPUs). Further processor 130 may include multiple processors of the same or different type. Electronic Device 100 may also include a memory 140. Memory 140 may each include one or more different types of memory, which may be used for performing device functions in conjunction with processor 130. For example, memory 140 may include cache, ROM, and/or RAM. Memory 140 may store various programming modules during execution, including warping module 155 and position detection module 160.

Electronic device 100 may also include one or more cameras, such as front-facing camera 110 and back-facing camera 120. Cameras 110 and 120 may each include an image sensor, a lens stack, and other components that may be used to capture images. In one or more embodiments, the cameras may be directed in different directions in the electronic device. For example, front-facing camera 110 may be positioned in or on a first surface of the electronic device 100, while the back-facing camera 120 may be positioned in or on a second surface of the electronic device 100. In one or more embodiments, the first and second surfaces may be opposite surfaces of the electronic device 100. As another example, the back-facing camera may be configured to capture images of an environment from the back of the electronic device 100, whereas front-facing camera is configured to capture images of the user, or other objects in front of the device. Although two cameras are depicted, as will be described in further detail below, in one or more embodiments, electronic device 100 may include a single camera, or may include additional cameras, such as two back-facing cameras and one front facing camera. In one or more embodiments, the electronic device 100 may also include a display 150. Display 150 may be any kind of display device, such as an LCD (liquid crystal display), LED (light-emitting diode) display, OLED (organic light-emitting diode) display, or the like. In addition, display 150 could be a semi-opaque display, such as a heads-up display or the like. Display 150 may be located on the same surface of the electronic device 100 as the front-facing camera 110.

Although electronic device 100 is depicted as comprising the numerous components described above, in one or more embodiments, the various components may be distributed across multiple devices. Further, additional components may be used, some combination of the functionality of any of the components may be combined.

In one or more embodiments, position detection module 160 is configured to determine spatial relationships between a user and the device. For example, position detection module 160 may utilize sensor data, for example from back-facing camera 120 or sensors 175 to detect a viewpoint of a user. As an example, the position detection module 160 may track a relative position of a viewpoint compared to the device. In one or more embodiments, the viewpoint may be a point in space from which the scene is viewed via the display. For example, the viewpoint may be located at or near a user's eye or eyes, such as in the middle of the user's eyes, or at a location near the user's eyes. In one or more embodiments, the position detection module 160 may track a relative pose of an eye to the display 150 of the electronic device 100. That is, position detection module 160 may implement eye tracking and/or gaze detection technology. In one or more embodiments, the viewpoint may be considered the position in space at or near which a user's eye is located. The pose of the user's eye and the relationship of the eye to the electronic device may be determined using the front-facing camera 110 to capture an image of the user's eye. The camera capturing the image of the user's eye may be a traditional camera, including a lens stack and sensor, or may be a lenseless camera. According to one or more embodiments, the relationship between the pose of the eye and the display may be based on one or more intermediary measurements. As an example, the position detection module 160 may determine a relationship between the viewpoint and the front-facing camera 110, or other component of the electronic device. From there, the position detection module 160 may determine the spatial relationship between the viewpoint and the display 150 based on known spatial relationships between the various components of electronic device 100. Further, in one or more embodiments, a sensor (e.g., depth sensor) may be used to determine a distance between the viewpoint and the electronic device, as well as an angular position and orientation between the viewpoint and the electronic device.

In one or more embodiments, the position detection module 160 may additionally, or alternatively, utilize other sensor data from sensors 175 capable of tracking movement and position of a viewpoint, such as a user's eye. The position detection module 160 may further track a target at which an eye is gazing, according to one or more embodiments. A gaze detection method may be utilized to identify a region or object of interest in the real environment. As an example, the position detection module 160 may determine a location on the display 150 at which a user is gazing, and identify an object or region in the real environment associated with that location.

According to one or more embodiments, warping module 155 may include instructions executable by a processor 130 to generate a warped image of a real environment as captured by back-facing camera 120. In one or more embodiments, the warping module may obtain an image of a real environment, for example, by back-facing camera 120. The warping module 155 may generate a warped view of the real environment based on the viewpoint determined by the position detection module 160 such that the image of the environment appears substantially contiguous or seamless with the real environment as viewed from the viewpoint. Said another way, in one or more embodiments, the image may be warped such that an image of the scene on the display of the electronic device appears substantially contiguous with the scene viewed around the electronic device from the viewpoint. For example, a first portion of the scene may be visible from the viewpoint in the display, and may appear substantially contiguous with a second portion of the scene visible around the electronic device. The scene may appear substantially contiguous if the view of the scene is interrupted by a boundary of the display and/or the electronic device from the viewpoint.

In one or more embodiments, the warping module 155 warps the image by back-projecting an image based on camera intrinsics in order to obtain a 2D mapping for the 3D environment. The back-projection may be based on a target depth. The target depth may be predetermined, or determined based on a region of interest, or point of interest, in the image. For example, the depth may be selected based on a depth of an object of interest. In one or more embodiments, functionality of the electronic device 100 may be utilized to select a depth. As an example, in one or more embodiments, the depth may be selected based on a detected subject, for example, using an autofocus operation of the electronic device 100. As another example, the warping module 155 may utilize sensor data to detect depth of field of the scene of the real environment. Sensor data may be utilized in order to determine depth based on stereoscopic methods, structured light, time of flight, and the like. Stereoscopic methods may include utilizing a stereo camera system to determine depth in a field of view, such as through stereo estimation. A structured light operations may involve projecting a pattern onto a scene and determining a depth of the scene based on the appearance of the projected pattern. Time of flight operations may include determining distance based on a determination of a time it takes for a wave to travel to an object in the scene. A depth map may either be determined or obtained that may be used to determine a depth. For example, a depth may be determined from a depth map for a particular point or region of interest. According to one or more embodiments, back-projecting the image may include identifying four image corners, where the frustum from the camera intersects the determined depth. Thus, based on the determined depth, four points in space may be identified. The resulting plane may be determined to be the back-projected image.

In one or more embodiments, the warping module 155 further re-projects the back-projected image based on the determined relationship between the viewpoint and the display. In one or more embodiments, the re-projected image is displayed on the screen such that the image of the scene matches the real world "background" scene. Said another way, the image is warped such that the plane defined by the four points is displayed on the display 150. Thus, the portion of the scene hidden by the electronic device when viewed from the viewpoint, is visible in the display. The remaining portion of the scene may be visible from the viewpoint in the real world surrounding the electronic device from the viewpoint. As another example, an object in the scene may be partially obfuscated by the electronic device when viewed from the viewpoint. A first portion of the object may be visible in the real environment from the viewpoint, and a second portion of the object may be visible in the image of the environment shown in the display.

In one or more embodiments, the warping module may further warp the image to better match the scene in the real environment. For example, the warping module may perform color correction on the image, such as performing a white balancing function, such that the coloration of the image better matches coloring in the real environment.

Figure 2:
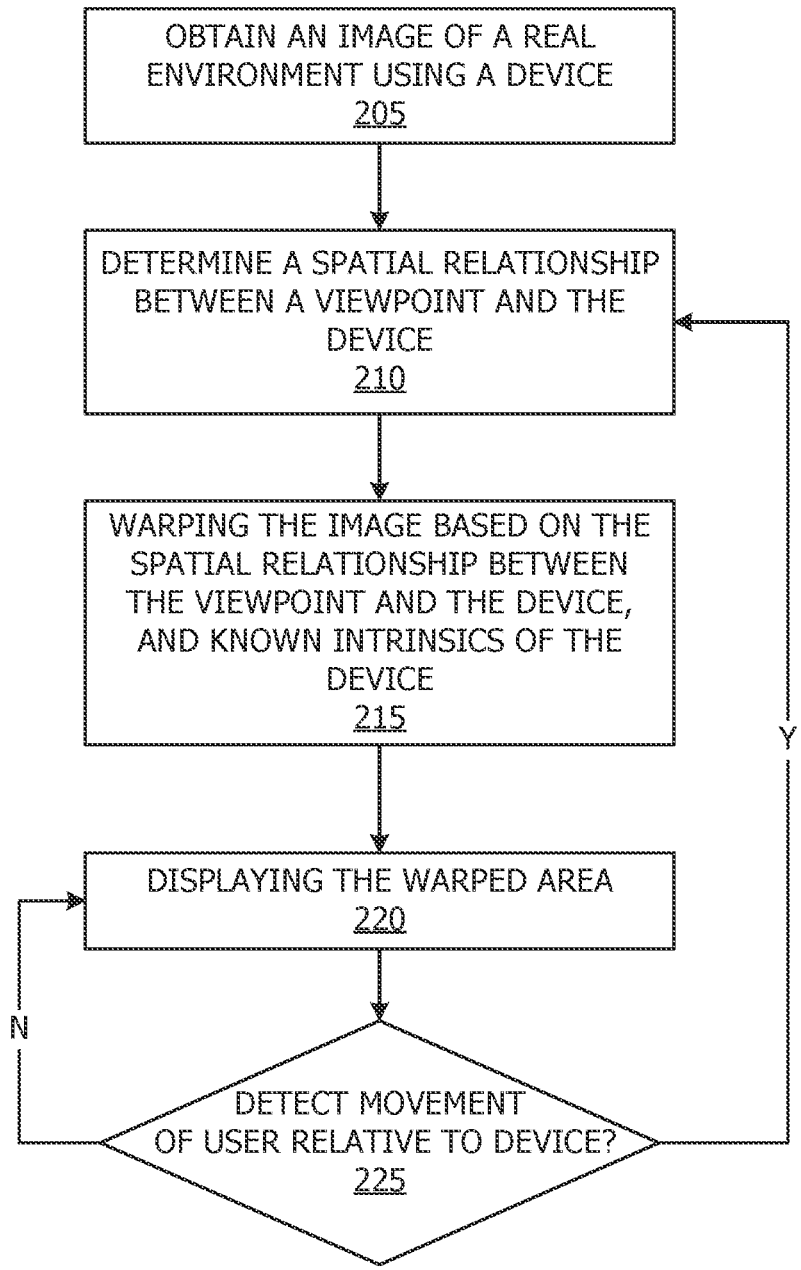
FIG. 2 shows, in flow chart form, an example method for displaying a warped image of a real environment, according to one or more embodiments.

FIG. 2 shows, flow chart form, a method for providing a warped display of a real environment. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flow chart begins at 205 where the warping module 155 obtains an image of a scene in a real environment. In one or more embodiments, warping module 155 may obtain the image from back-facing camera 120. In one or more embodiments, the warping module 155 may obtain the image from another source, such as an external camera, or a peripheral camera. An image may include a still image, a video stream, a series of frames, a live image, or the like.

The flow chart continues at 210, where the warping module 155 determines a spatial relationship between a viewpoint and the device. In one or more embodiments, the spatial relationship is obtained from the position detection module 160. According to one or more embodiments, the spatial relationship may be based on a relationship between a location of a viewpoint, such as a location at or near one or both eyes of a user, and the display 150 of electronic device 100. In one or more embodiments, the eye from which viewpoint is determined may be predetermined, for example, based on a dominant eye for the user, or based on a location between a user's two eyes, or the like.

According to one or more embodiments, the viewpoint may change over time. For example, a user may move the electronic device relative to their face. The viewpoint may be tracked, for example, with a user-facing sensor on the electronic device, such as front-facing camera 110 or another sensor from the sensors 175 in the electronic device. As an example, the point of view of the user may be determined based on a detection of the user's gaze, by performing head or eye tracking based on sensor data from an RGBD sensor data. In one or more embodiments, sensor data may be used to track other facial landmarks, such as eye positions, to determine a relative location of the user from the device, and the gaze direction of the user. As another example, an RGB only sensor (that is, an RGB sensor that doesn't capture depth information), may be used to track head position, facial landmarks, and the like. In one or more embodiments, depth information of the user may be determined using other means, such as a time-of-flight laser range sensor. The depth may also be inferred through characteristics in an image captured by the front-facing camera of a user's face, such as the spacing between the users' eyes, based on a user's inter-pupillary distance. The data regarding the gaze direction of the user and the relative position of the user may be used to determine a viewpoint of the user, according to one or more embodiments.

The flow chart continues at 215, and the warping module 155 warps the image based on the spatial relationship between the viewpoint and the device, along with the known intrinsics of the camera. In one or more embodiments, the warping module 155 may back-project the image based on intrinsics of the camera capturing the image. Then, the warping module 155 may re-project the back-projected image based on the determined viewpoint.

The flowchart continues at 220 and the warping module 155 displays the warped image. As described above, the warping module 155 may display a single warped image based on a single determined viewpoint. Further, if the display 150 includes a stereo display, then warping module 155 may display two warped images, each corresponding a viewpoint from each of a user's eyes, as an example.

At 225, a determination is made regarding whether movement is detected. In one or more embodiments, a determination is made regarding whether movement of the viewpoint is detected in relation to the electronic device. If at 225 a determination is made that movement is not detected, then the warped area is continued to be displayed, as in at 220. In one or more embodiments, continuing to display the warped image may include continuing to generate updated warped images based on updated image data received by the electronic device. Said another way, the image data may be continued to be warped in a same manner if a movement between the viewpoint and the electronic device is not detected. Thus, for example, if the scene changes, or a relationship between the scene and the electronic device changes, such as if the user pans the electronic device, the image may be continued to be warped in a same or similar manner.

Returning to 225, if a determination is made that the movement is detected, then the flow chart continues at 210, where the new spatial relationship between the viewpoint and the device is determined. Thus, in one or more embodiments, the new spatial relationship between the viewpoint and the device may require the image to be warped in a different manner to appear substantially contiguous with the real world environment.

Figure 3:
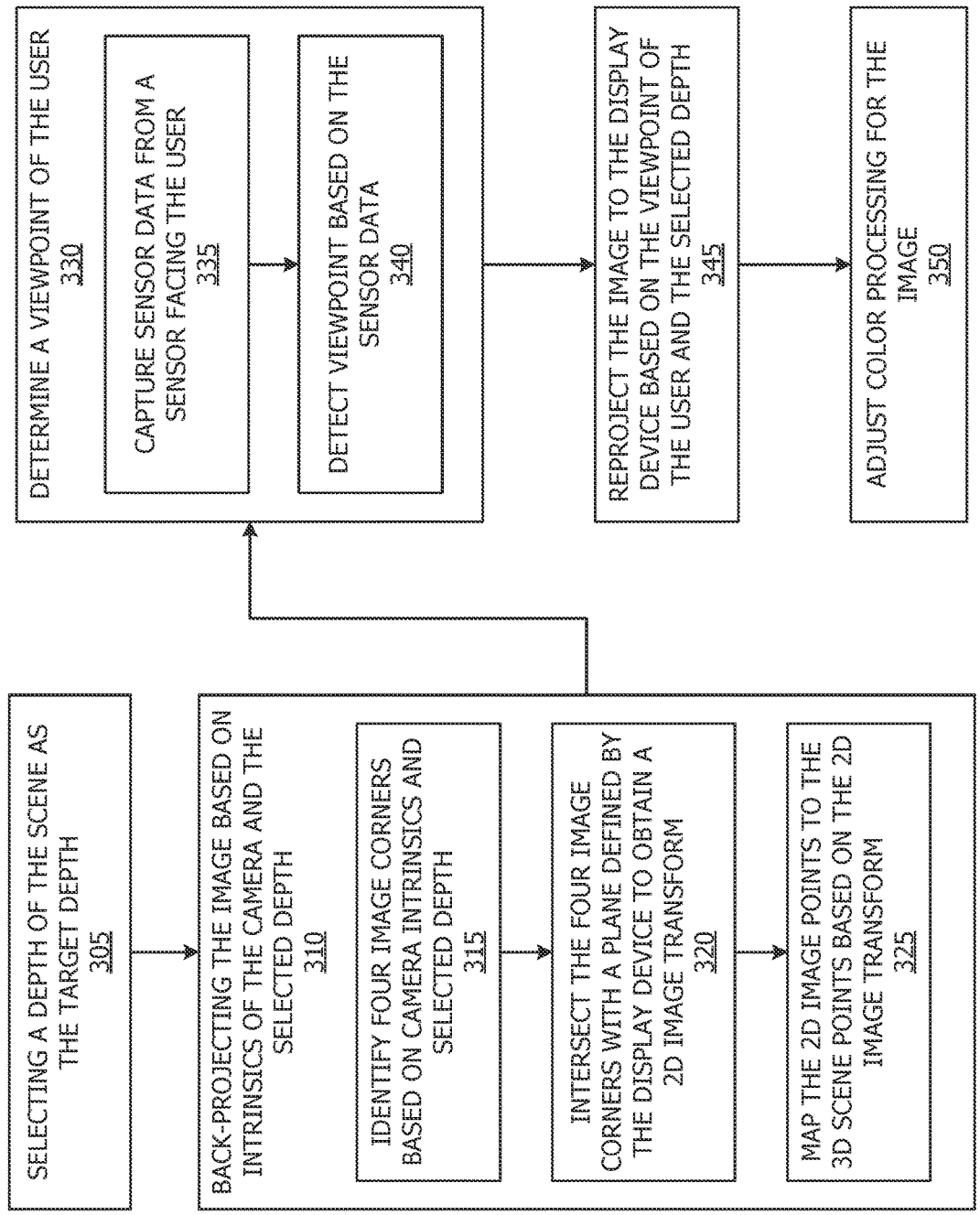
FIG. 3 shows, flow chart form, method for warping an image of a real environment in accordance with one or more embodiments.

Referring now to FIG. 3, a flow chart showing a method for warping an image of a scene in a real environment such that the image appears substantially contiguous or seamless with the real environment from a viewpoint, according to one or more embodiments. In one or more embodiments, the various actions take place as part of warping the image based on the spatial relationship between the viewpoint and the device, and the known intrinsics of the device, as in 215 of FIG. 2. However, the various actions may take place in other locations within FIG. 2. For purposes of explanation, the following steps will be described in the context of the various components described in FIG. 1. However, it should be understood that the various actions may be taken by alternate components. In addition, the various actions may be performed in a different order. Further, some actions may be performed simultaneously, and some may not be required, or others may be added.

The flow chart begins at 305 and the warping module 155 selects a depth of a scene as the target depth. In one or more embodiments, in order to transform (or re-project) the camera image accurately may require 3D information from every pixel in the image. However, the 2D camera image may no longer have any depth information. Therefore, a single depth may be selected for every pixel in the image. In one or more embodiments, the depth may be selected based on a depth of the main subject in the scene, such as a person or object. In one or more embodiments, the depth may be based on a location in the scene where a user may be looking. Selecting the depth of the main subject in the scene may ensure that the main subject the user is viewing has approximately the correct scale and position in order to maintain the illusion of transparency of the electronic device. In one or more embodiments, the depth of the main subject in the scene relative to the electronic device may be estimated through any method that determines depth. For example, if the back-facing camera 120 actually includes two cameras, the depth of the scene may be estimated using stereo estimates from the pair of scene-facing cameras. In another example, the depth of the scene may be determined using another sensor, such as a time-of-flight laser range sensor, or other depth sensing technology.

The flow chart continues at 310, and the warping module back-projects the image based on the intrinsics of the camera and the selected depth. As depicted, in one or more embodiments, back-projecting the image may include various actions. As shown, back-projecting the image may include, at 315, identifying four image corners based on camera intrinsics and the selected depth. At 320, the four image corners are intersected with a plane defined by the display device to obtain a 2D image transform. Then, at 325, the 2D image points are mapped to the 3D scene based on the 2D image transformation.

The flow chart continues at 330, where the position detection module 160 determines a viewpoint. For example, the viewpoint may be a point in space from which a user is viewing the scene. In one or more embodiments, the viewpoint may be a point in three space from which a scene is viewed, and may include directional information. The directional information may identify a direction at which a user is gazing in the scene or on the display, for example. As depicted within 330, in one or more embodiments, determining a viewpoint may include various actions. At 335, the position detection module 160 captures sensor data from a sensor facing the user. Then, at 340, the position detection module 160 detects the viewpoint based on the sensor data.

The flow chart continues at 345, where the warping module re-projects the image to the display device based on the viewpoint of the user and the selected depth. The flow chart concludes at 350, where the warping module adjusts color processing for the image. In one or more embodiments, if the warping module 155 were able to determine depth of the scene (for example, if back-facing camera 120 were actually a stereo camera, or if sensors 175 included additional sensors that provided depth information), then each pixel may be re-projected based on actual depth information, and may appear more accurate than selecting a single depth at 305.

According to one or more embodiments, if back-facing camera 120 included a stereo camera, or multiple cameras, then the various cameras may have multiple viewpoints. Thus, the various steps of FIG. 3 may be reproduced for each camera. Further, according to one or more embodiments, each of the various steps of FIG. 3 may be completed for each eye. Thus, when determining the spatial relationship between the viewpoint and the device, the viewpoint of each eye may be determined at 210. Further, if the display 150 is a stereoscopic display, then at 220 the warped image for each eye may be displayed.

Figure 4:
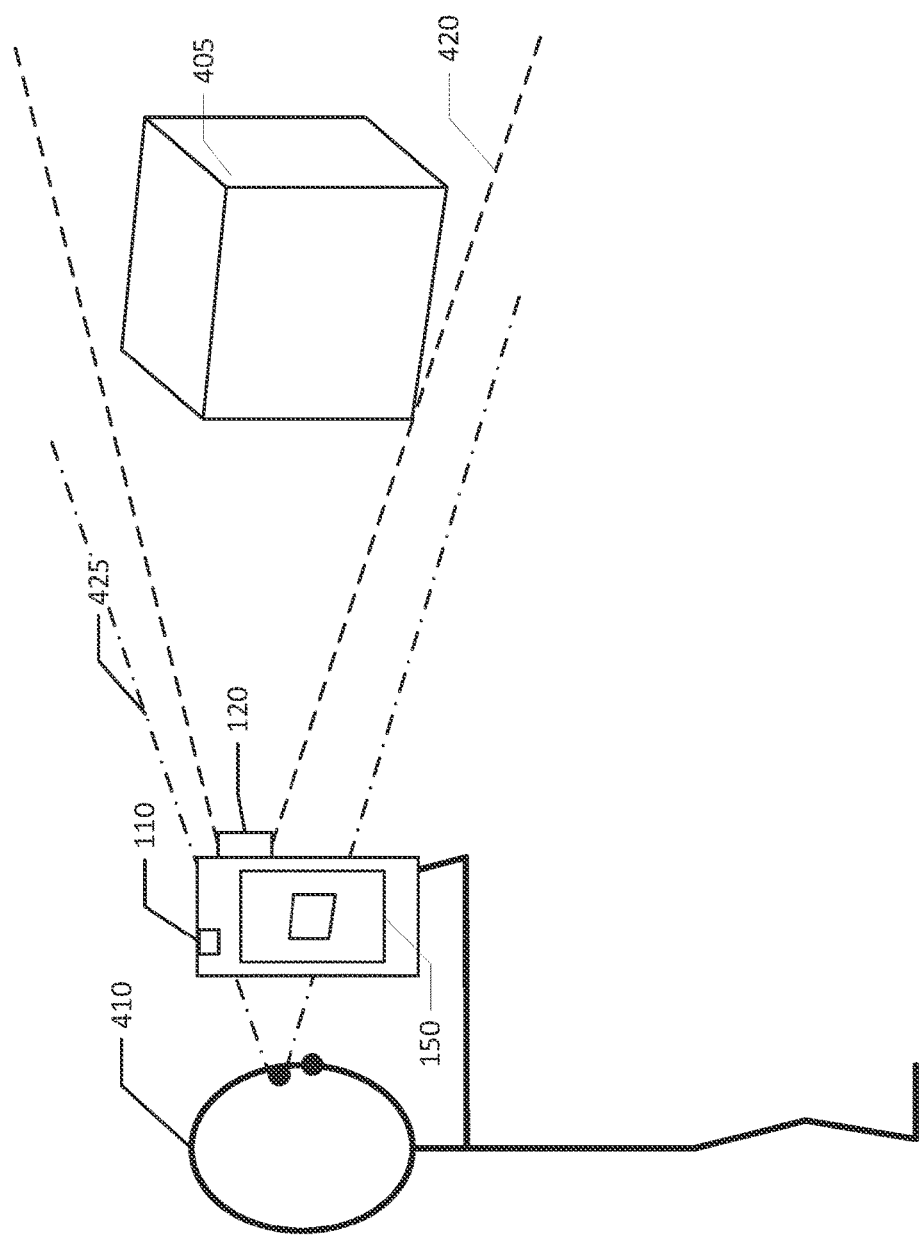
FIG. 4 shows, in system diagram form, an example setup of using a device to view images of a real world environment, according to one or more embodiments.

Referring now to FIG. 4, a system diagram is shown for an example setup for utilizing a device for presenting a warped image of a real environment, according to one or more embodiments. FIG. 4 shows a user 410 utilizing an electronic device 100 that includes a front-facing camera 110, a back-facing camera 120. In one or more embodiments, the user may view a real environment 405 through the front-facing camera 110 of the electronic device 100 from a viewpoint. In one or more embodiments, an image of the real environment 405 includes a field of view that is similar to a user's field of view 425 if the user were to look directly at the real environment 405.

Figure 5:
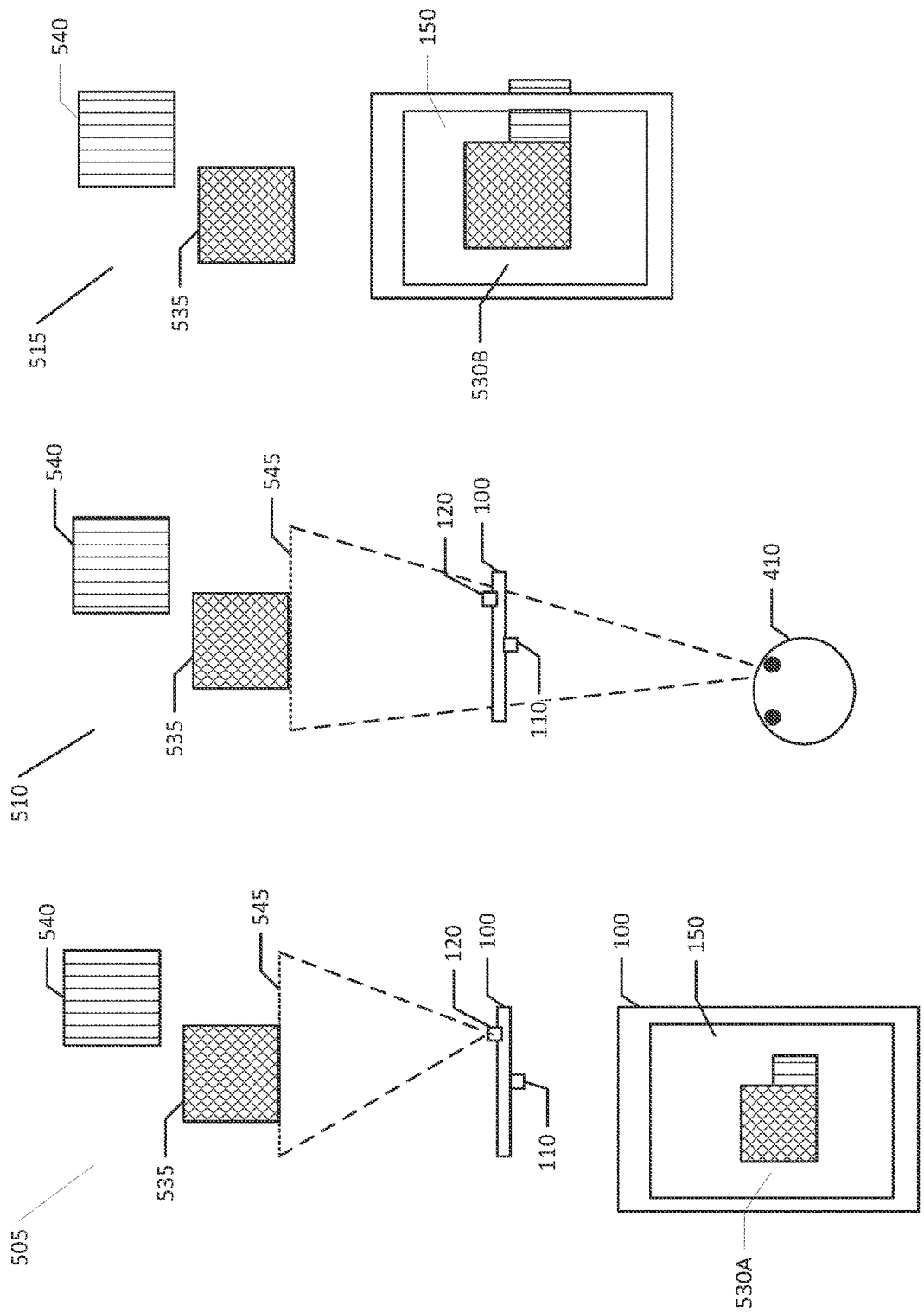
FIG. 5 shows an example system diagram illustrating a method of displaying a warped image of a real environment, according to one or more embodiments.

FIG. 5 shows an example system diagram of an augmented reality device to warp images, according to one or more environments. FIG. 5 shows three points in time during which various portions of embodiments are practiced. At 505, a first version of the electronic device 100 is shown. The electronic device 100 includes a display 150, which may show a preview image 530A of two blocks 535 and 540, in a real environment. At 505, electronic device 100 captures the image 530A of the real environment, including the two blocks 535 and 540. The image 530A may be captured by back-facing camera 120.

At 510, in one or more embodiment, the position detection module may determine a viewpoint of user 410. In one or more embodiments, the viewpoint may be detected using a front-facing camera 110, or some other sensor on the electronic device 100. In addition, in one or more embodiments, the warping module 155 also back-projects the image 530A to the selected depth 545. In one or more embodiments, the selected depth may be determined using a set depth, or based on a detected object in the scene. For example, the depth may be determined using an auto-focus or similar functionality to determine a depth of a particular point of interest in the scene. The image may be back-projected by intersecting the four points that define the camera view frustum, and a plane defined by the selected depth. The warping module then re-projects the image pack to the display device based on the viewpoint of the user 410 and the selected depth 545.

At 515, the example flow diagram depicts an updated image 530B on the electronic device 100 from the viewpoint of the user 410. As shown, blocks 535 and 540 both appear as they would if the display device was not in the way, as is apparent by the fact that block 540 is only partially shown in the image 530B, but the rest of the block is still visible, and appears seamless, in the real environment in the view adjacent to the device. According to one or more embodiments, the scene appears seamless in the image and the real environment if the objects in the image appear at substantially the same scale and location as if the user were looking at the scene from the same viewpoint but not through the display. In one or more embodiments, the image appears seamless if the environment in the image appears substantially continuous with the real environment from the viewpoint. For example, the image may be substantially continuous with the real environment if the user views the real environment at the same scale and distance through the electronic device as they would if they electronic device were not present. Thus, any frame around the display or the electronic device may interfere with the view of the real environment, but the image may still be considered seamless or substantially continuous with the background real environment.

Figure 6:
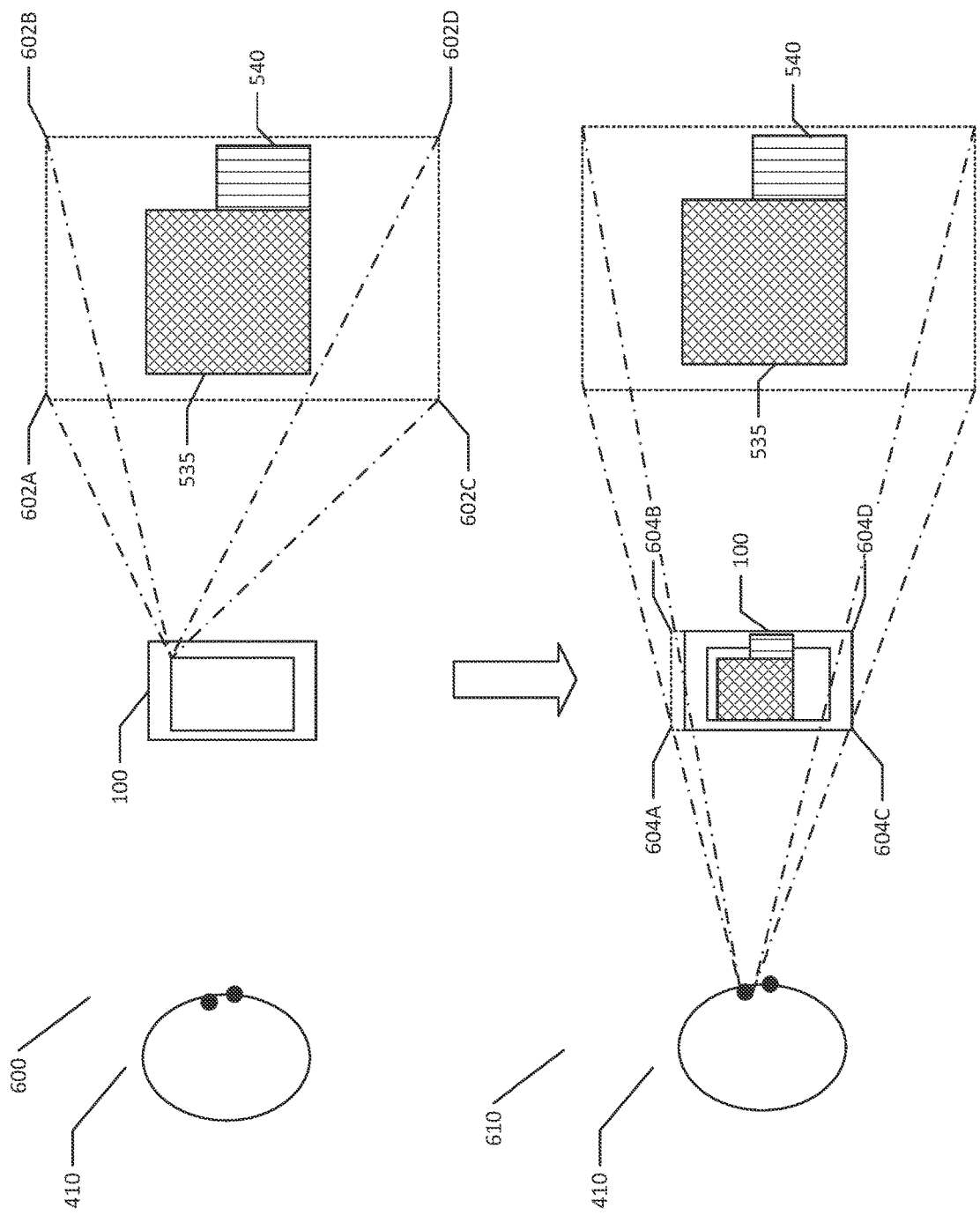
FIG. 6 shows, an example system diagram illustrating a warping method, according to one or more embodiments.

Referring now to FIG. 6, an example system diagram illustrating a warping method is presented, according to one or more embodiments. At 600 a user at a viewpoint 410 viewing a scene that includes blocks 535 and 540 through an electronic device 100. At 600, the four corners of the frustum from the camera to the determined depth of the scene are identified. As described above, the depth may be determined using a number of methods, such as an object detection technique, auto focus, user input, or the like. The four corners of the frustum are shown as 602A, 602B, 602C, and 602D. The plane defined by the four corners 602 may then be back-projected onto the display of electronic device 100. In one or more embodiments, back-projecting the image captured within the plane may be back-projected based on a spatial relationship between the camera and the display of the electronic device 100. In one or more embodiments, the spatial relationship between the camera and the display may be known or encoded, for example by the electronic device 100, or may be otherwise determined.

Turning to 610, the image plane defined by the four corners 602 is reprojected onto the display of the electronic device 100. In one or more embodiments, the reprojection is based on the viewpoint, for example the location and gaze direction of an eye or eyes of a user 410. Thus, the reprojection includes four corners 604A, 604B, 604C, and 604D, based on the frustum from the viewpoint to the plane. In one or more embodiments, reprojecting the image generates an image for display in the electronic device 100. In one or more embodiments, by reprojecting the image based on the viewpoint, the scene including blocks 535 and 540 may result in the blocks 535 and 540 appearing at the same scale and location through the electronic device 100 as they appear in the real world environment. For example, if block 540 is partially occluded by the electronic device from the gaze direction and location of the viewpoint, a portion of the block 540 that is occluded will appear in the display of the electronic device 100 as it would if the electronic device 100 were not occluding the portion of the image. Further, in one or more embodiments, the occluded portion and non-occluded portion of block 540 may appear substantially continuous from the viewpoint. As an example, block 540 may appear continuous except for the border of the electronic device 100 around the display.

Figure 7:
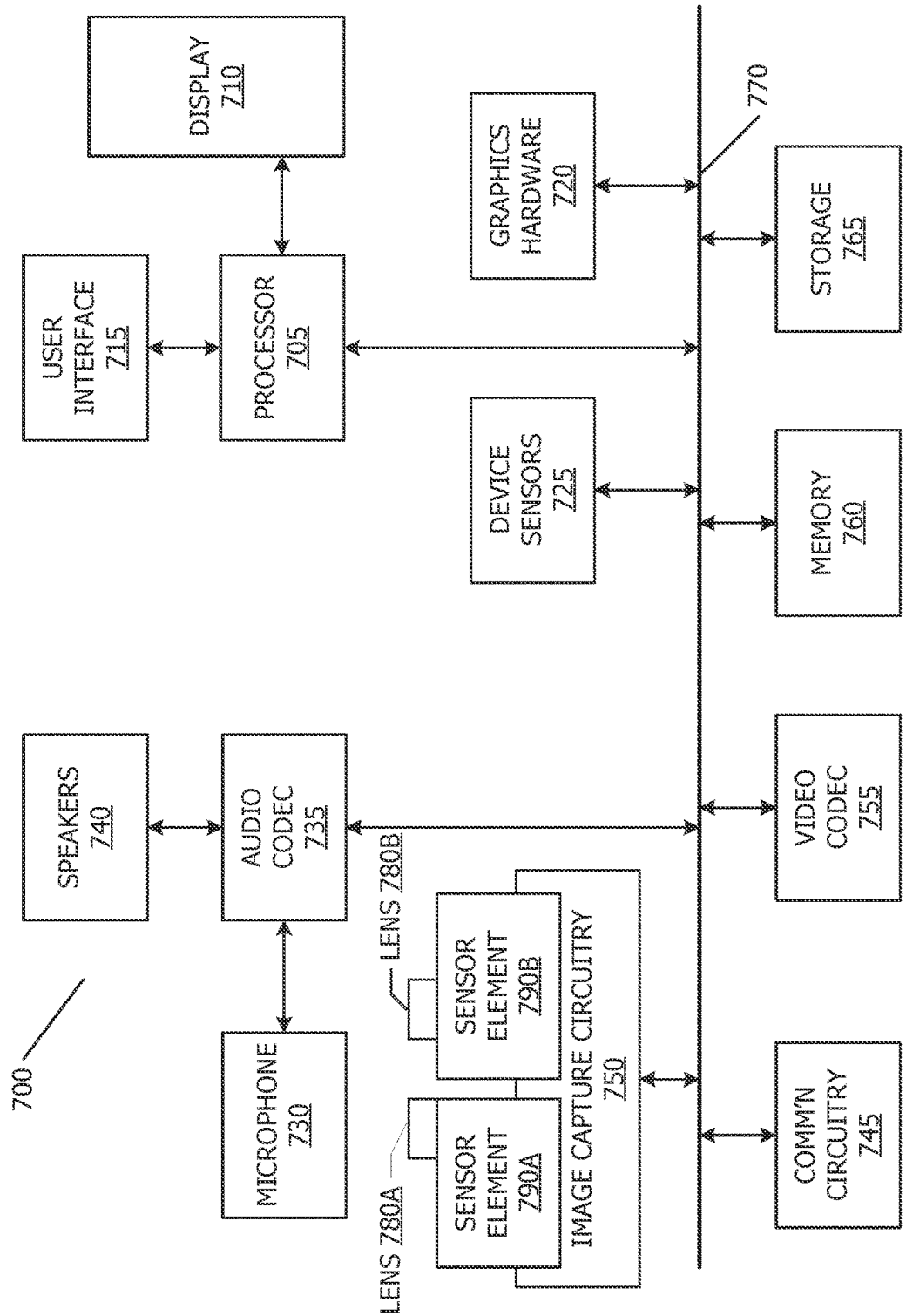
FIG. 7 shows, in block diagram form, a simplified multifunctional device according to one or more embodiments.

Referring now to FIG. 7, a simplified functional block diagram of illustrative multifunction device 700 is shown according to one embodiment. Multifunction electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture circuitry 750 (e.g., including camera system) video codec(s) 755 (e.g., in support of digital image capture unit), memory 760, storage device 765, and communications bus 770. Multifunction electronic device 700 may be, for example, a digital camera or a personal electronic device such as a personal digital assistant (PDA), personal music player, mobile telephone, or a tablet computer.

Processor 705 may execute instructions necessary to carry out or control the operation of many functions performed by device 700 (e.g., such as the generation and/or processing of images as disclosed herein). Processor 705 may, for instance, drive display 710 and receive user input from user interface 715. User interface 715 may allow a user to interact with device 700. For example, user interface 715 can take a variety of forms, such as a button, keypad, dial, a click wheel, keyboard, display screen and/or a touch screen. Processor 705 may also, for example, be a system-on-chip such as those found in mobile devices and include a dedicated graphics processing unit (GPU). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 to process graphics information. In one embodiment, graphics hardware 720 may include a programmable GPU.

Image capture circuitry 750 may include two (or more) lens assemblies 780A and 780B, where each lens assembly may have a separate focal length. For example, lens assembly 780A may have a short focal length relative to the focal length of lens assembly 780B. Each lens assembly may have a separate associated sensor element 790. Alternatively, two or more lens assemblies may share a common sensor element. Image capture circuitry 750 may capture still and/or video images. Output from image capture circuitry 750 may be processed, at least in part, by video codec(s) 755 and/or processor 705 and/or graphics hardware 720, and/or a dedicated image processing unit or pipeline incorporated within circuitry 765. Images so captured may be stored in memory 760 and/or storage 765.

Sensor and camera circuitry 750 may capture still and video images that may be processed in accordance with this disclosure, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705 and graphics hardware 720 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to tangibly retain computer program instructions or code organized into one or more modules and written in any desired computer programming language. When executed by, for example, processor 705 such computer program code may implement one or more of the methods described herein.

According to one or more embodiments, camera-based transparent display may have numerous uses. For example, the techniques described above may be used for image stabilization. That is, a warping function utilized to warp the image may also be utilized to stabilize an image. In another embodiment, the camera-based transparent display may be used for machine learning. For example, a camera may capture images of a scene and classify the scene, and/or objects within the scene. In one or more embodiments, by tracking an object at which a user's eye is gazing, objects may be identified which should be classified.

In one or more embodiments, the camera-based transparent display may be used for presenting virtual information on the display, for example for augmented reality purposes. As an example, digital information associated with a particular location may be displayed in a more accurate location as perceived from a particular viewpoint through the display. As an example, an image of the scene may be enhanced by additional text or image data at a particular point within the scene in the warped image. In one or more embodiment, the digital information may be associated with a particular object in the scene. When the object falls within the warped image (or, when the object is visible in the display), then the digital information associated with the object may be displayed along with the object in the warped image. In one or embodiment, as the warped image changes, whether a change in the scene occurs, or a change in the warping occurs due to a change in location of the viewpoint or the device relative to the scene, the digital information may also change.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for presenting an image of a scene, comprising:
   capturing an image of a scene by a camera of an electronic device, wherein the electronic device comprises the camera and a display, and wherein the camera and the display have a first spatial relationship;
   determining a second spatial relationship between a viewpoint and the display of the electronic device;
   warping the image to obtain an image of a first portion of the scene based on the first spatial relationship and the second spatial relationship so that the first portion of the scene appears at a same scale as a second portion of the scene visible outside an edge of the electronic device; and
   presenting the warped image on the display.

2. The method of claim 1, wherein warping the image further comprises:
   back-projecting the image based on intrinsics of the camera and a depth in the scene; and
   re-projecting the image to the display based on the second spatial relationship.

3. The method of claim 2, further comprising:
   selecting the depth using at least one selected from a group consisting of an autofocus operation, a stereo estimation, a time of flight operation, and a structured light operation; and
   backprojecting the image based on the selected depth.

4. The method of claim 2, wherein back-projecting the image comprises:
   identifying four image corners, based on the intrinsics of the camera and the depth; and
   intersecting the four image corners with a plane defined by the display to obtain a 2D image transform.

5. The method of claim 1, wherein warping the image further comprises:
   identifying an object in the scene; and
   warping the image such that a first portion of the object is visible in the scene from the viewpoint and an image of a second portion of the object is visible on the display from the viewpoint, and wherein the first portion and the second portion are substantially aligned.

6. The method of claim 1, further comprising:
   detecting a movement of the electronic device;
   obtaining an updated image of the scene from the electronic device;
   determining an updated spatial relationship between an updated viewpoint and the display of the electronic device;
   warping the updated image based, at least in part, on the updated spatial relationship to obtain an updated warped image; and
   displaying the updated warped image on the display.

7. A non-transitory computer readable medium comprising computer readable code for presenting an image of a scene, executable by one or more processors to:
    capture an image of a scene by a camera of an electronic device, wherein the electronic device comprises the camera and a display, and wherein the camera and the display have a first spatial relationship;
    determine a second spatial relationship between a viewpoint and the display of the electronic device;
    warp the image to obtain an image of a first portion of the scene based on the first spatial relationship and the second spatial relationship so that the first portion of the scene appears at a same scale as a second portion of the scene visible outside an edge of the electronic device from the viewpoint; and
    present the warped image on the display.

8. The non-transitory computer readable medium of claim 7, wherein the computer readable code to warp the image further comprises computer readable code to:
    back-project the image based on intrinsics of the camera and a depth in the scene; and
    re-project the image to the display based on the second spatial relationship.

9. The non-transitory computer readable medium of claim 8, further comprising computer readable code to:
    select the depth using at least one selected from a group consisting of an autofocus operation, a stereo estimation, a time of flight operation, and a structured light operation; and
    backproject the image based on the selected depth.

10. The non-transitory computer readable medium of claim 8, wherein the computer readable code to back-project the image comprises computer readable code to:
    identify four image corners, based on the intrinsics of the camera and the depth; and
    intersect the four image corners with a plane defined by the display to obtain a 2D image transform.

11. The non-transitory computer readable medium of claim 7, wherein the computer readable code to warp the image further comprises computer readable code to perform a color correction on the image.

12. The non-transitory computer readable medium of claim 11, wherein the computer readable code to perform the color correction on the image comprises computer readable code to perform a white balance function on the image.

13. The non-transitory computer readable medium of claim 7, wherein the camera is a back-facing camera, and wherein a front-facing camera captures a second image comprising at least part of a user, and wherein the viewpoint is determined based on the second image.

14. The non-transitory computer readable medium of claim 7, wherein the computer readable code to warp the image further comprises computer readable code to:
    identify an object in the scene; and
    warp the image such that a first portion of the object is visible in the scene from the viewpoint and an image of a second portion of the object is visible on the display from the viewpoint, and wherein the first portion and the second portion are substantially aligned.

15. The non-transitory computer readable medium of claim 7, further comprising computer readable code to:
    detect a movement of the electronic device;
    obtain an updated image of the scene from the electronic device;
    determine an updated spatial relationship between an updated viewpoint and the display of the electronic device;
    warp the updated image based, at least in part, on the updated spatial relationship to obtain an updated warped image; and
    display the updated warped image on the display.

16. A system for presenting an image of a scene, comprising:
    one or more processors; and
    one or more memory devices coupled to the one or more processors and comprising computer readable code executable by the one or more processors to:
        capture an image of a scene by a camera of an electronic device, wherein the electronic device comprises the camera and a display, and wherein the camera and the display have a first spatial relationship;
        determine a second spatial relationship between a viewpoint and the display of the electronic device;
        warp the image to obtain an image of a first portion of the scene based on the first spatial relationship and the second spatial relationship so that the first portion of the scene appears at a same scale as a second portion of the scene visible outside an edge of the electronic device from the viewpoint; and
        present the warped image on the display.

17. The system of claim 16, wherein the computer readable code to warp the image further comprises computer readable code to perform a color correction on the image.

18. The system of claim 16, wherein the camera is a back-facing camera, and wherein a front-facing camera captures a second image comprising at least part of a user, and wherein the viewpoint is determined based on the second image.

19. The system of claim 16, wherein the computer readable code to warp the image further comprises computer readable code to:
    identify an object in the scene; and
    warp the image such that a first portion of the object is visible in the scene from the viewpoint and an image of a second portion of the object is visible on the display from the viewpoint, and wherein the first portion and the second portion are substantially aligned.

20. The system of claim 16, further comprising computer readable code to:
    detect a movement of the electronic device;
    obtain an updated image of the scene from the electronic device;
    determine an updated spatial relationship between an updated viewpoint and the display of the electronic device;
    warp the updated image based, at least in part, on the updated spatial relationship to obtain an updated warped image; and
    display the updated warped image on the display.

* * * * *